(12) United States Patent
Mickelson

(10) Patent No.: US 6,694,615 B2
(45) Date of Patent: Feb. 24, 2004

(54) METHOD FOR MANUFACTURING A WELDED HYDRAULIC CYLINDER FOR REDUCING HOOP STRESS

(75) Inventor: Roger D. Mickelson, West Burlington, IA (US)

(73) Assignee: Case Corporation, Racine, WI (US)

( * ) Notice: Subject to any disclaimer, the term of this patent is extended or adjusted under 35 U.S.C. 154(b) by 114 days.

(21) Appl. No.: 10/037,405

(22) Filed: Dec. 21, 2001

(65) Prior Publication Data

US 2003/0115735 A1 Jun. 26, 2003

(51) Int. Cl.[7] .................................................. F01B 29/00
(52) U.S. Cl. ........................ 29/888.06; 29/530; 92/128; 156/305; 228/132
(58) Field of Search ...................... 29/888.06, 888.061, 29/458, 460, 525.14, 530, 506, 516; 156/305, 294; 264/261, 262; 228/131, 132; 92/128, 164

(56) References Cited

U.S. PATENT DOCUMENTS

| | | | | |
|---|---|---|---|---|
| 2,487,512 A | * | 11/1949 | Berger | 29/516 |
| 4,037,305 A | * | 7/1977 | Larsson | 29/506 |
| 4,190,479 A | * | 2/1980 | Smith | 156/294 |
| 4,706,364 A | * | 11/1987 | Aubry | 29/458 |
| 4,901,424 A | * | 2/1990 | Menendez | 156/294 |
| 4,930,204 A | * | 6/1990 | Schurter | 29/516 |
| 5,014,601 A | * | 5/1991 | Sundholm | 29/888.061 |
| 5,358,168 A | * | 10/1994 | Williamson | 228/132 |
| 6,439,103 B1 | | 8/2002 | Miller | |
| 2003/0116012 A1 | | 6/2003 | Mickelson | |

* cited by examiner

Primary Examiner—Gregory Vidovich
Assistant Examiner—Jermie E. Cozart
(74) Attorney, Agent, or Firm—John William Stader; Collin A. Webb

(57) ABSTRACT

A method for manufacturing a welded cylinder is provided wherein a seal (such as an O-ring seal or a cured polymeric sealant) is disposed between the tube of a cylinder and its welded end plug. The seal is spaced away from the circumferential weld that joins the end plug to the cylinder to reduce the hoop stress in the tube adjacent the weld, thereby reducing the tensile stress at the weld joint.

4 Claims, 3 Drawing Sheets

METHOD FOR MANUFACTURING A WELDED HYDRAULIC CYLINDER FOR REDUCING HOOP STRESS

FIELD OF THE INVENTION

The invention relates generally to hydraulic cylinders. More particularly, it relates to welded hydraulic cylinders formed of a cylindrical tube and an end cap or plug that is circumferentially welded to the cylinder to enclose one end of the cylinder. More particularly, the invention relates to methods of reducing hoop stress at the weld joint in the cylinders.

BACKGROUND OF THE INVENTION

Hydraulic cylinders are used in a wide variety of industrial applications. One of the more common uses is as actuators on work vehicles. Work vehicles, such as agricultural tractors, road graders, telehandlers, skid steer loaders, mobile drilling rigs, use either single or double acting hydraulic cylinders to move various components of the work vehicle and to move implements attached to the work vehicle with respect to the vehicle and with respect to each other.

A common method of manufacturing these cylinders is to machine and polish the inside diameter of a cylindrical tube. A plug or end cap is machined to enclose one end of the tube through which fluid will be introduced or removed from the cylinder. The end plug is partially inserted into the cylindrical tube, is clamped in a rotational welding machine, and is rotated in that machine while a circumferential weld is made that bonds one end of the tube to a portion of the plug.

To ensure that the plug and the cylindrical tube are properly aligned during the welding process, the plug is usually provided with a small pilot portion on one end that is inserted into the tube. This pilot portion has a smaller diameter than the rest of the plug portion and the junction between these two portions, often called the pilot portion and the eye portion, is formed as a planar or conical shoulder. To assemble the tube and plug, the pilot portion is inserted into the tube until the shoulder on the plug abuts an end face of the tube. The weld is formed between the end face of the tube and the abutting shoulder portion of the plug.

A common failure mode for such welded cylinders is that of weld failure. Hydraulic pressure acting against the inside surface of the tube creates hoop stress, which tends to cause the tube to expand, to increase in diameter. The plug, on the other hand, is typically made of a very large, solid piece of steel that does not expand when hydraulic fluid presses against its internal surfaces. As a result, a very high bending stress is created right at the weld joint that couples the tube and the plug. The tube expands radially when pressure is applied. The plug does not expand. Since the junction between the tube and the plug is the circumferential weld joint, it is the circumferential weld joint where the stress is maximum.

One way of avoiding failures at the tube-to-plug joint has been to provide a more flexible coupling. For example, rather than employing a weld to join the tube and plug, many cylinders, especially smaller cylinders, use a thread joint between the tube and plug. In these cylinders, a pilot portion of the outside diameter of the plug is threaded, and a corresponding inside portion of the end of the tube is also threaded. To couple the two together, the threads on the outside of the plug are engaged with the threads on the inside of the tube and the two are threaded together. When hydraulic fluid under pressure is introduced into the cylinder, the tube expands slightly due to the hoop stress generated by the fluid. Since the bond between the tube and the plug is a thread joint, the tube is free to expand slightly thereby slightly increasing the gap between the tube and the plug. This non-restrictive joint allows slight expansion of the tube to occur without additional stresses of a joint trying to restrain it. In this manner, the tube is made stronger. In addition, by eliminating the weld joint, the "cast" portion of the cylinder, the cylinder is made much more resistant to stress generally.

Of course, since the tube is permitted to expand with respect to the plug, a gap between the two, along the thread joint is created. This gap, although small, provides a fluid leakage path. Fluid inside the cylinder will leak out of the cylinder along this thread joint. For this reason, a fluid tight seal that is relatively flexible is placed between the plug and the tube. In smaller cylinders, this may be nothing more than a wrapping of thin Teflon® tape around the external threads on the plug. For larger cylinders, however, such as those that have an area greater than about ½' in diameter, an O-ring is typically placed in a circumferential groove in the plug before it is inserted into the tube. The O-ring extends circumferentially around the diameter of the plug and abuts both the plug and the tube providing a generally fluid-tight seal between the two that prevents fluid in the cylinder from leaking out between the threads on the plug and the mating threads on the tube. When the tube in these threaded cap arrangements are pressurized with hydraulic fluid, they expand. The O-ring, however, is selected to have a sufficient pre-load to maintain contact with the internal walls of the tube even when it expands slightly due to hoop stress.

What is needed, therefore, is an improved hydraulic cylinder design that provides the low cost and ease of manufacture of a welded cylinder, yet reduces the longitudinal tensile forces on the weld to increase the cylinder's longevity. It is an object of this invention to provide such a hydraulic cylinder.

SUMMARY OF THE INVENTION

In accordance with the invention a hydraulic cylinder for use in a work vehicle is provided that includes a cylinder portion having a circular cylindrical tube with a first end, a threaded second end, an inner cylindrical surface with an inner diameter and a tube longitudinal axis, a plug having a pilot portion disposed inside the tube and an eye portion extending outside the tube and a plug longitudinal axis, a circular weld extending around the circumference of the plug between the plug portion and the eye portion and coupling the first end of the tube to the plug between the pilot portion and the plug portion, and a seal disposed between and sealing against the pilot portion and the inner cylindrical surface of the tube. In addition to the cylindrical portion the cylinder includes a threaded end plug configured to be engaged with threads on the threaded second end of the tube to enclose and seal the second end of the tube and defining a central longitudinal rod opening, and a piston assembly including a piston configured to be slidingly supported within the cylindrical tube and a piston rod fixed thereto and extending out of the cylindrical tube through the rod opening.

In accordance with the invention, a method of manufacturing a hydraulic cylinder for a work vehicle is provided where the cylinder includes a plug with a pilot portion and an eye portion that is inserted into a cylindrical tube. The method includes the steps of inserting the pilot portion of the plug into the first end of the cylinder, forming a circumferential weld between the plug and the first end of the cylinder around the entire circumference of the plug and tube to thereby form a hydraulic fluid tight seal between the plug and tube, and inserting a seal into the second end of the tube such that it is coaxial with the plug and seals the pilot portion against the tube portion.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENT

Figure 1:
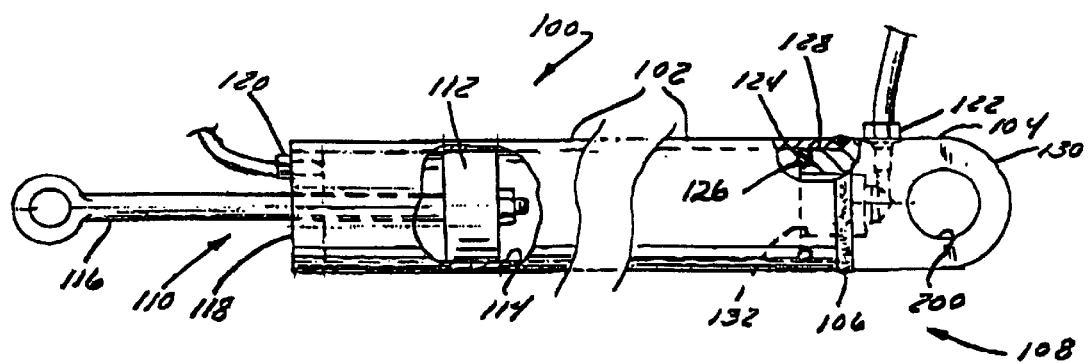
FIG. 1 is a partial cut away view of a hydraulic cylinder in accordance with the present invention.

Referring now to FIG. 1, a hydraulic cylinder 100 is shown comprising a tubular portion 102 welded to a plug 104 at weld joint 106. Since the tube and plug are joined together by weld joint 106, they form an integral tube and plug assembly 108. A piston assembly 110 is provided including a piston 112, which is disposed inside and sealingly engages with inner cylindrical wall 114. This piston assembly 110 also includes piston rod 116, which is fixed to piston 112. Piston 112 and inner wall 114 are so dimensioned as to permit piston 112 to slide within tube portion 102 while maintaining a hydraulic fluid tight seal between the outer surface of piston 112 and inner wall 114. A second plug 118 is threadedly engaged with the distal end of tube portion 102 located away from plug 104. Threads formed on the outer surface of plug 118 engage mating threads formed on the inner surface of tube portion 102 at the distal end of tube portion 102.

Hydraulic cylinder 100 is a double-acting cylinder having two ports 120 and 122 located at opposing ends of tube portion 102. Port 120 may be formed in second plug 118 to permit hydraulic fluid to flow into and out of the cylinder. Alternatively, it may be formed in the tube itself at a location generally adjacent to plug 118. Port 122 may be formed in plug 104 to permit fluid to flow into and out of the cylinder. An O-ring 124 is disposed in a circumferential groove 126 in the outer circumferential surface 128 of plug 104. O-ring 124 preferably has a diameter of between 0.020 and 0.250 inches. More preferably it has a diameter of between 0.040 and 0.180 inches. Even more preferably it has a diameter of between 0.060 and 0.150 inches.

Plug 104 is configured as two integrally formed portions: an eye portion 130 that extends outward away from weld joint 106 and a pilot portion 132 that extends inward into tube portion 102 from weld joint 106. Outer circumferential surface 128 and circumferential groove 126 are formed in the pilot portion 132 of plug 104.

Figure 2:
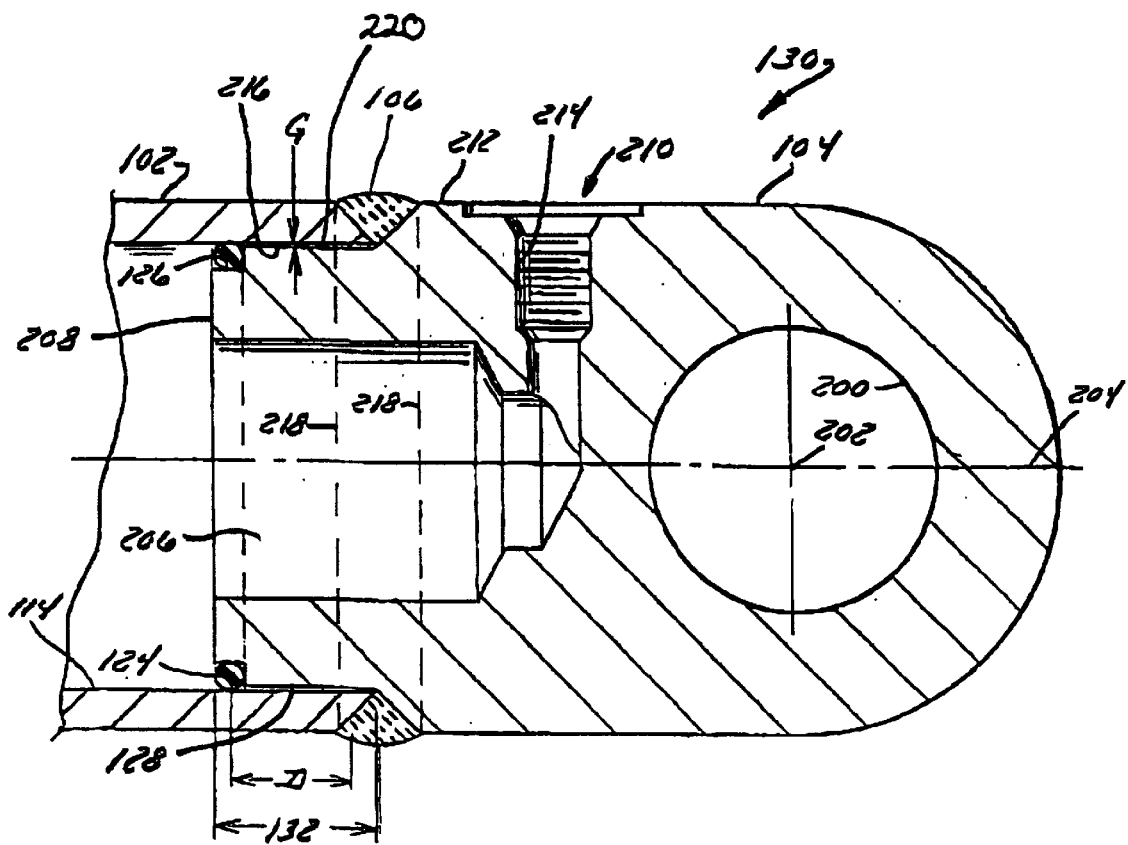
FIG. 2 is a cross-sectional view of the cylinder plug of FIG. 1 taken along the longitudinal axis of both the tube and the plug.

Referring now to FIG. 2, plug 104 and the end of tube portion 102 are shown in greater detail. As shown by cross-hatching, plug 104 is an integral body. It has an eye 200 formed in eye portion 130 with a longitudinal axis 202 that is perpendicular to and intersects longitudinal axis 204 of plug 104 itself. A counter bore 206 is formed in pilot portion 132 extending from free inner surface 208, through pilot portion 132 and into eye portion 130. Counter bore 206 is preferably coaxial with plug 104 sharing the same longitudinal axis 204. An intersecting bore 210 is formed in eye portion 130 extending between outer circumferential surface 212 of eye portion 130 into counter bore 206 which it intersects. An inner surface of bore 210 has internal threads 214 configured to engage hydraulic line or coupling. Intersecting bore 210 defines port 122 previously identified in FIG. 1.

Outer circumferential surface 128 of pilot portion 132 is spaced away from the inner circumferential surface 216 of tube portion 102. In this manner, a gap "G" is provided between the two surfaces 216 and 128. This gap, on the order of 0.001 to 0.020 inches, depending upon the tolerance stackups of the cylinder, is small enough to hold plug 104 and tube portion 102 in close alignment to permit accurate welding (indicated by weld joint 106), yet is large enough to permit plug 104 to be inserted into tube 102 without undue force. Such force, if the gap is too small, could cause plug 104 to jam when it is inserted into the open end of tube 102 prior to welding. O-ring 124, weld joint 106, inner surface 216, and outer surface 128 define a sealed cylindrical cavity 220. O-ring 124 is disposed in circumferential groove 126 and is sized such that it seals against groove 126 and also against the inner circumferential surface 216 of tube portion 102. The O-ring is not provided to prevent leakage out of the cylinder, however, since weld joint 106 prevents fluid leakage. Weld joint 106, as shown by dashed lines 218 extends circumferentially around the entire outer surface of tube 102 and plug 104, thereby providing an integral metal seal between tube 102 and plug 104. Weld joint 106 is comprised of metal from tube 102, metal from plug 104, and additional metal deposited during the welding process. Its microstructure is cast, and is not work-hardened. O-ring 124 is not positioned directly adjacent to weld joint 106, but is spaced away from weld joint 106 by a distance "D". Distance "D" is preferably between 1 and 0.1 inches. More preferably it is between 0.5 and 0.2 inches. Most preferably it is between 0.4 and 0.25 inches. Experiments conducted on welded cylinders using an O-ring such as that shown in FIGS. 1 and 2 illustrate the unusual and unanticipated results of applying an O-ring to a pilot portion of a welded cylinder.

Figure 3A:
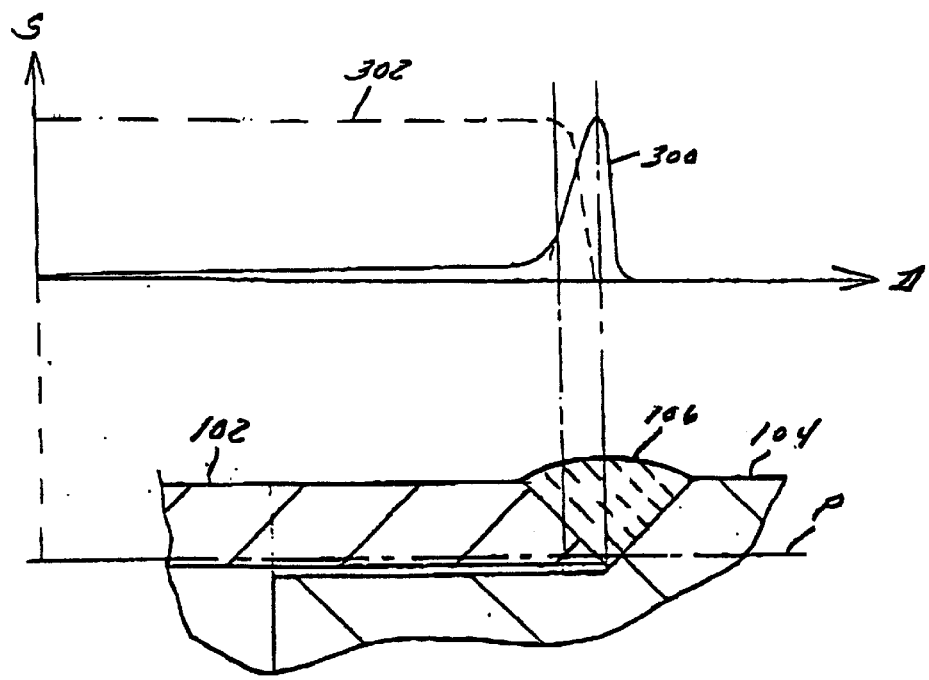
FIGS. 3A and 3B are charts and partial sectional views of a cylinder lacking the seal between the tube and the plug, and a cylinder having the seal disposed between the tube and the plug showing the longitudinal tensile and hoop stresses generated within the cylinder along a path "P" that extends along the inner surface of the tube and through the plug of these cylinders at the same depth.

FIG. 3A illustrates a pair of exemplary hoop stress and longitudinal tensile stress curves for a prior art welded cylinder. In FIG. 3A, the solid curve 300 represents longitudinal tensile stress in the tube at its inner surface 216. Dashed curve 302 represents the hoop stress within the cylinder caused by hydraulic fluid pressure. Note that the longitudinal tensile stress in tube portion 102 is quite low away from plug 104. As one travels along tube portion 102 towards plug 104, the longitudinal tensile stress begins to increase, indicating how weld joint 106 constrains the expansion of tube 102 when hydraulic fluid is applied inside cylinder 100. The longitudinal tensile stress reaches a maximum in the vicinity of weld joint 106. It rapidly falls off as we traverse path "F" into plug 104. In a similar fashion, the hoop stress indicated by curve 302 is at a maximum in tube 102 and drops to near zero in weld joint 106. Thus, the longitudinal tensile stress in cylinder 100 is maximum right at weld joint 106. This high longitudinal tensile stress produces weld joint failure. Its effects are amplified by the fact that it is applied right at the root of a "crack" —the joint between the tube and the plug where the weld is formed. This region, while not formed by cracking but by welding, is a stress concentrator due to its very small radius of curvature right where the weld is formed.

Figure 3B:
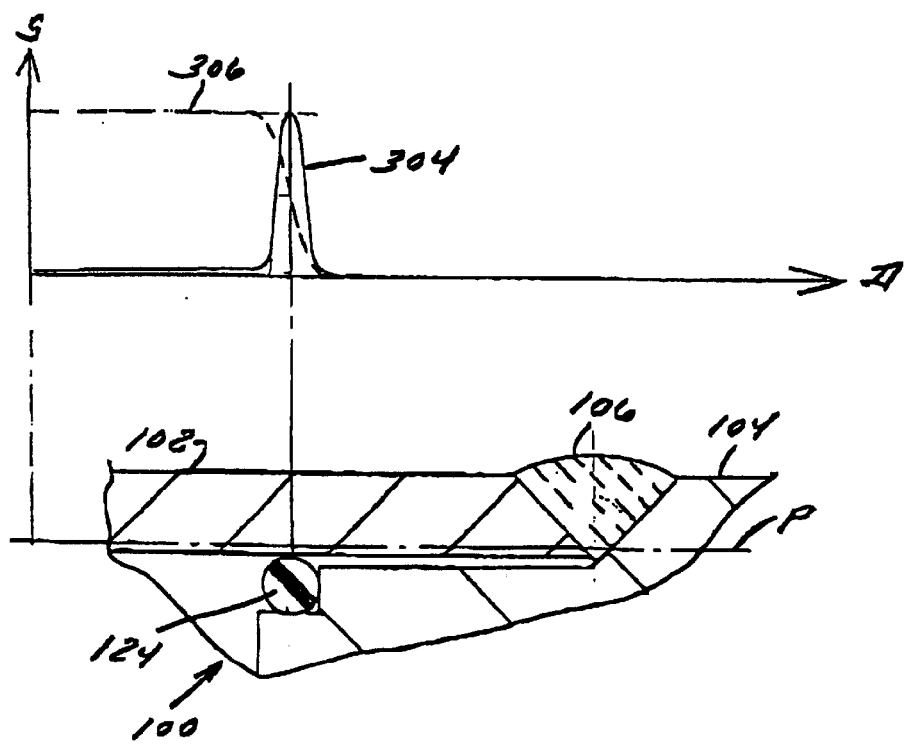

FIG. 3B illustrates the changes in cylinder stress provided by the use of O-ring 124. As in the previous example of FIG. 3A, hoop stress 306 is at its maximum in a portion of tube 102 located away from plug 104. As one traverses path "P" through cylinder 100, from left to right, the hoop stress drops dramatically, approaching zero, in the vicinity of O-ring 124. At the same time, the longitudinal tensile stress indicated by curve 304 is at a minimum in tube 102 located away from plug 104 and rises to a maximum in the vicinity of O-ring 124. Longitudinal tensile stress 304 decays to near zero as we traverse path "P" rightwardly from O-ring 124 to weld joint 106. Thus, longitudinal tensile stress is at its maximum in the vicinity of O-ring 124 and is significantly reduced at weld joint 106, as compared to the longitudinal tensile stress that would exist in the absence of O-ring 124.

This reduction in stress, or rather the transfer of stress from weld joint 106 to the vicinity of O-ring 124 is unexpected and anomalous. While O-rings have been provided in the past in cylinder plug grooves, their function has been to prevent leakage of fluid through a thread joint between the cylinder tube and the cylinder plug. They have not been used, nor is there any reason to use them, in hydraulic cylinders using a welded tube/plug joint, since the weld joint itself provides both mechanical connection and the leak proof seal.

Figure 4:
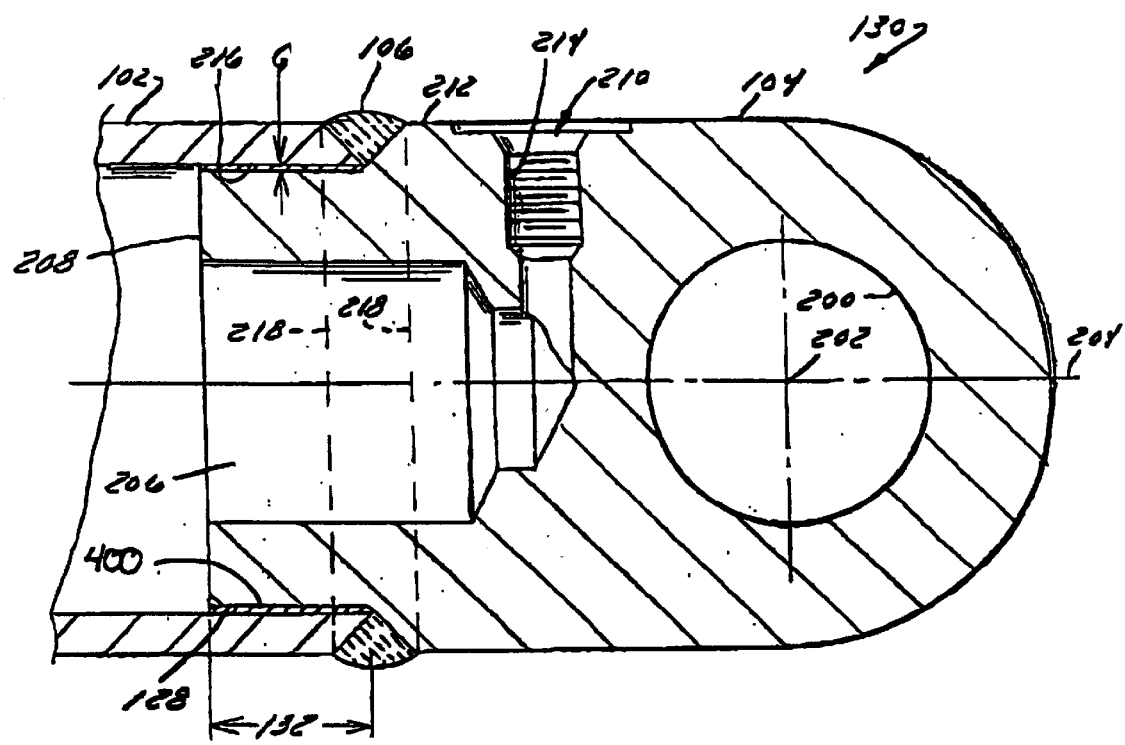
FIG. 4 is an alternative embodiment of the cylinder of FIGS. 1–2 in which the O-ring seal illustrated in those FIGURES is replaced with a polymeric adhesive seal.

FIG. 4 illustrates an alternative embodiment of the cylinder of FIGS. 1 and 2 in which a different seal 400 is provided between tube portion 102 and plug 104 in pilot portion 132. The embodiments shown in FIGS. 2 and 4 differ in one respect. In FIG. 4, circumferential groove 126 has been eliminated, together with O-ring 124 and is replaced with seal 400, preferably a polymeric sealant, that is disposed in gap "G" between inner circumferential surface 216 of tube portion 102 and outer circumferential surface 128 of pilot portion 132. The preferred polymeric sealant is an anaerobic adhesive, which is preferably of a low viscosity sufficient to permit it to penetrate gap "G" by capillary action. Suitable sealants include "Thread Locker 290®", "Loctite®603", or "Loctite®609". Each of these products are manufactured by Loctite Corporation.

To ensure a good bond, cleaning of the surfaces of the gap is preferred. The material for cleaning the surfaces is preferably 1,1,1-trichlorethane or any of the alternatives or equivalents for the solvent that are currently used. Such hydrocarbon-based solvents are preferred since they dry residue free, thus providing a good seal between the surfaces 216 and 128. A primer or surface activator such as "Primer 7471®", (Loctite Corporation) may be used after cleaning to enhance the quality of the bond where the metals that form tube 102 and plug 104 are passive. Primer 7471® is also beneficial when the gap "G" between the tube and plug is greater than about 0.004 of an inch.

It is surprising that the provision of an O-ring or sealant adjacent to a welded joint would reduce weld failures. First, cavity 220 that is being sealed is perhaps 0.001 to 0.020 inches in thickness (i.e. the gap between the inner wall of the tube and the outer surface of the pilot portion) with a length of 0.25 to 0.75 inches (the longitudinal distance between the weld and the O-ring) and a circumference of 8–16 inches (for a cylinder inner diameter of 2.5 to 5 inches). The volume that is sealed between the weld and the O-ring might vary in a typical rage of applications between 0.002 cubic inches and 0.25 cubic inches. This range of volumes is so small compared with the length of the O-ring (8–16 inches) that the O-ring would seem to provide little resistance to tiny quantities of fluid passing the O-ring to fill the sealed-off volume. Once the sealed-off volume was filled with fluid, one might expect that the O-ring would no longer reduce stress near the weld, since any pressure in the cylinder would immediately be communicated through the O-ring to the sealed-off volume. Surprisingly, this does not happen even after repeated pressure cycling of the fluid in the cylinder. The hoop stress in the tube adjacent the sealed-off portion stays low and thus the bending stress applied to the weld joint is minimized.

We are not sure of the mechanism that reduces stress in the tube between the O-ring and the weld that provides the benefits of the present invention. We believe it may be due to residual air trapped between the O-ring and the weld in the sealed-off volume. If air remains trapped in the sealed-off volume even after repeated pressure cycling, slight compression of the O-ring when the cylinder is pressurized will not raise the pressure in the sealed-off volume significantly. This mechanism would reduce hoop stress in the tube and reducing bending stress at the weld.

We do not intend for the claims to be limited to this possible mechanism of operation. It is provided only as a possibility.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of manufacturing a hydraulic cylinder for a work vehicle, the cylinder including a cylindrical tube and a plug having a pilot portion and an eye portion, the method comprising the steps of:

inserting the pilot portion of the plug into a first end of the cylindrical tube;

forming a circumferential weld between the plug and the first end of the cylindrical tube around the entire circumference of the plug and cylindrical tube to thereby form a hydraulic-fluid-tight junction between the plug and cylindrical tube; and inserting a seal into a second end of the cylindrical tube such that the seal is coaxial with the plug and seals the pilot portion against the cylindrical tube, wherein the step of inserting a seal comprises the steps of (i) providing a circumferential groove on the pilot portion of the plug; (ii) inserting an O-ring into the second end of the cylindrical tube after the step of forming a circumferential weld; and (iii) forcing the O-ring into the circumferential groove on the pilot portion of the plug.

2. A method of manufacturing a hydraulic cylinder for a work vehicle, the cylinder including a cylindrical tube and a plug having a pilot portion and an eye portion, the method comprising the steps of:

inserting the pilot portion of the plug into a first end of the cylindrical tube;

forming a circumferential weld between the plug and the first end of the cylindrical tube around the entire circumference of the plug and cylindrical tube to thereby form a hydraulic-fluid-tight junction between the plug and cylindrical tube; and inserting a seal into a second end of the cylindrical tube such that the seal is coaxial with the plug and seals the pilot portion against the cylindrical tube, wherein the step of inserting a seal comprises the steps of (i) pouring a liquid anaerobic adhesive into the second end of the cylindrical tube; (ii) filling a circumferential gap between the pilot portion and the cylindrical tube with the liquid anaerobic adhesive; and (iii) curing the anaerobic adhesive in the circumferential gap.

3. The method of claim 2, further comprising the step of filling the circumferential gap with a solvent cleaner prior to the step of pouring a liquid anaerobic adhesive into the cylindrical tube.

4. The method of claim 3, further comprising the step of filling the circumferential gap with an adhesive activator after the step of filling the circumferential gap with a cleaner and prior to the step of pouring a liquid anaerobic adhesive into the cylindrical tube.

* * * * *